J. FROHN.
TAPE MOISTENING AND CUTTING MACHINE.
APPLICATION FILED APR. 22, 1912.

1,058,958.

Patented Apr. 15, 1913.

5 SHEETS—SHEET 1.

Witnesses:

Inventor
Joseph Frohn
By his Attorneys
Briesen & Zuempe

J. FROHN.
TAPE MOISTENING AND CUTTING MACHINE.
APPLICATION FILED APR. 22, 1912.

1,058,958.

Patented Apr. 15, 1913.
5 SHEETS—SHEET 3.

Witnesses:
Inventor
Joseph Frohn
By his Attorneys

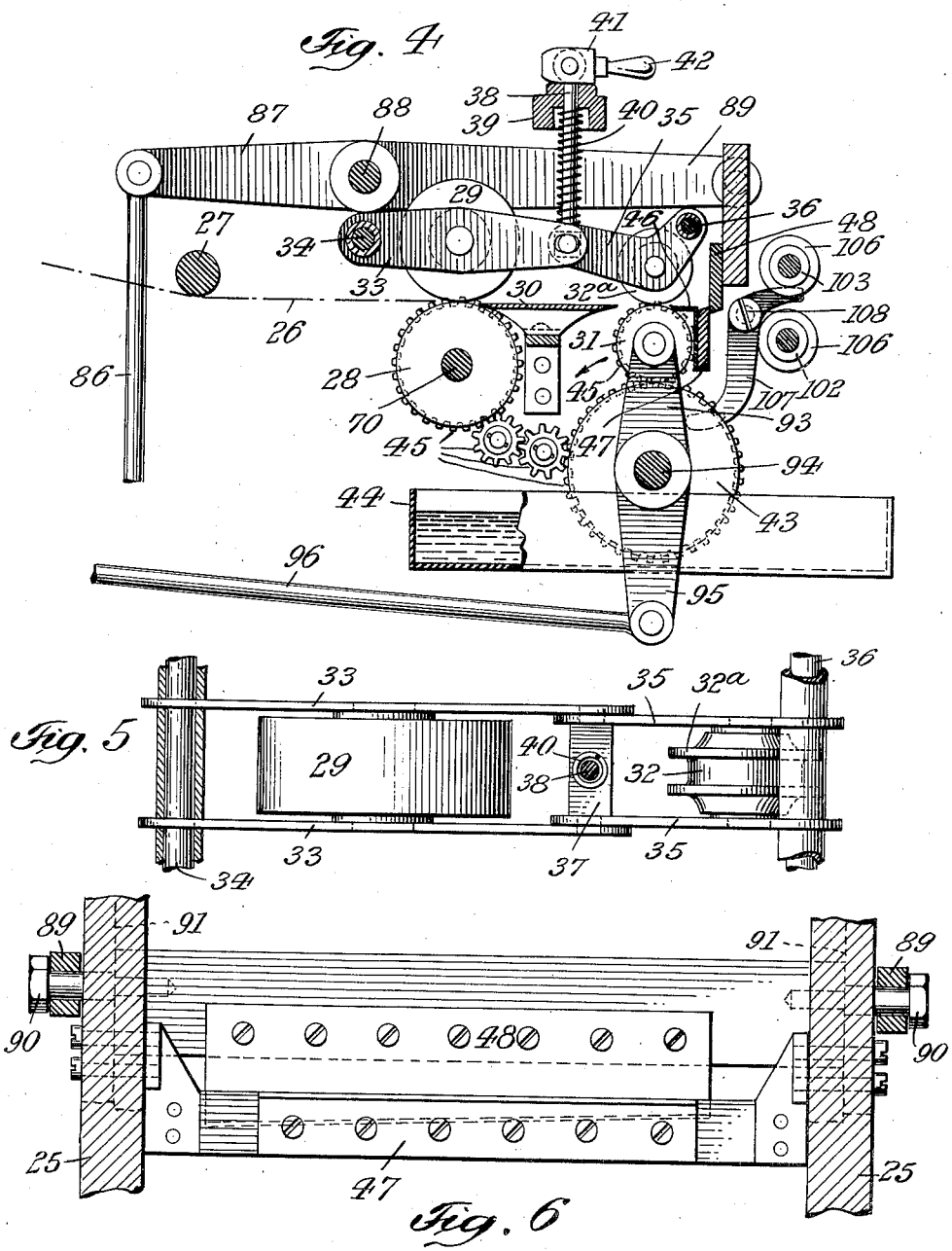

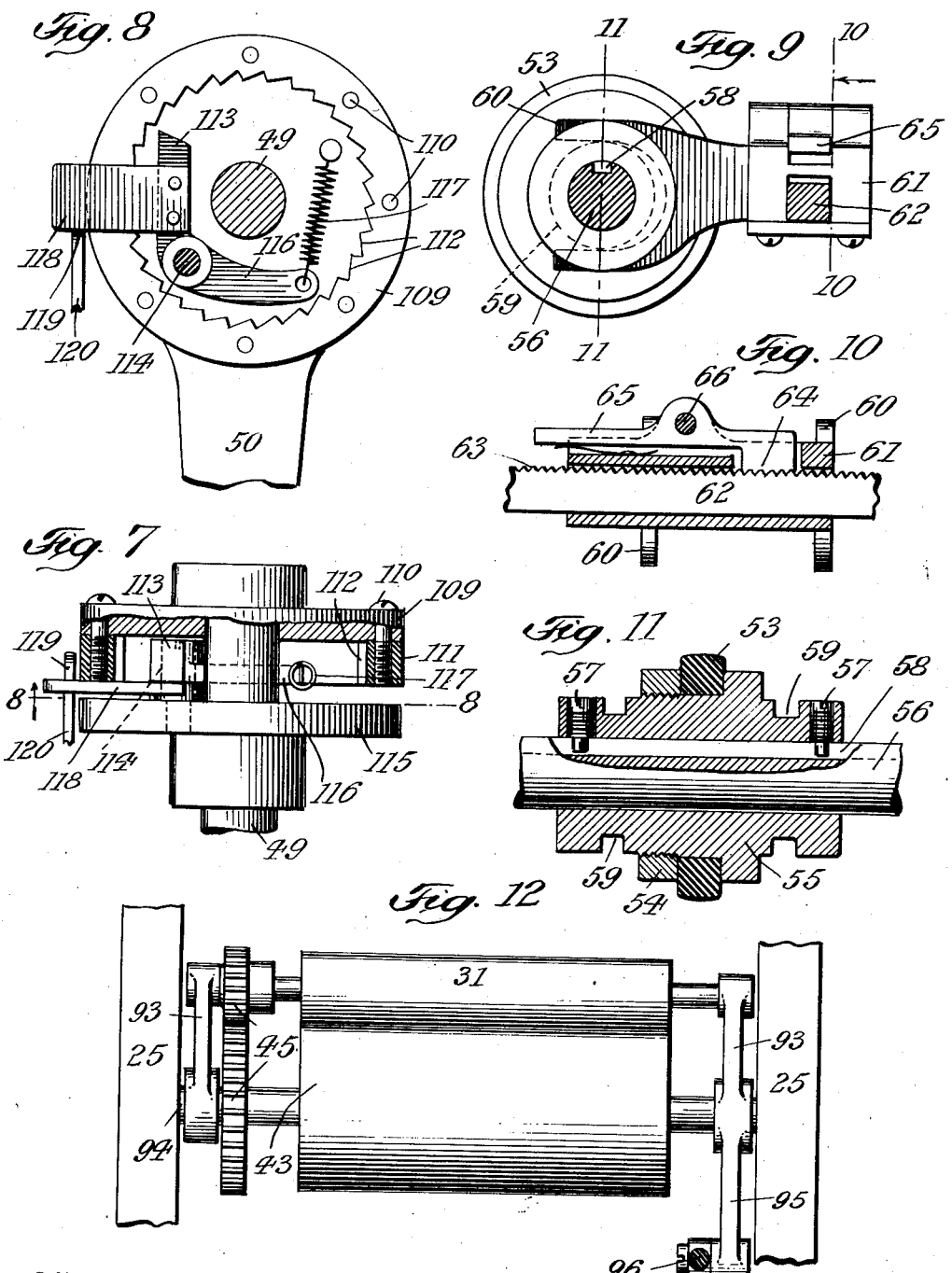

UNITED STATES PATENT OFFICE.

JOSEPH FROHN, OF NEW YORK, N. Y.

TAPE MOISTENING AND CUTTING MACHINE.

1,058,958.

Specification of Letters Patent.

Patented Apr. 15, 1913.

Application filed April 22, 1912. Serial No. 692,230.

*To all whom it may concern:*

Be it known that I, JOSEPH FROHN, a citizen of Germany, residing at New York city, county and State of New York, have invented a new and Improved Tape Moistening and Cutting Machine, of which the following is a specification.

This invention relates to a machine of novel construction for moistening tapes which have been previously coated with an adhesive, such tapes being used for sealing up boxes, packages and for similar purposes.

The machine is constructed with the particular view point of obtaining a large output and of automatically performing the functions of measuring, moistening and cutting the tapes, additional means being provided for gripping the severed tape-lengths and permitting their manual withdrawal.

Figure 1:
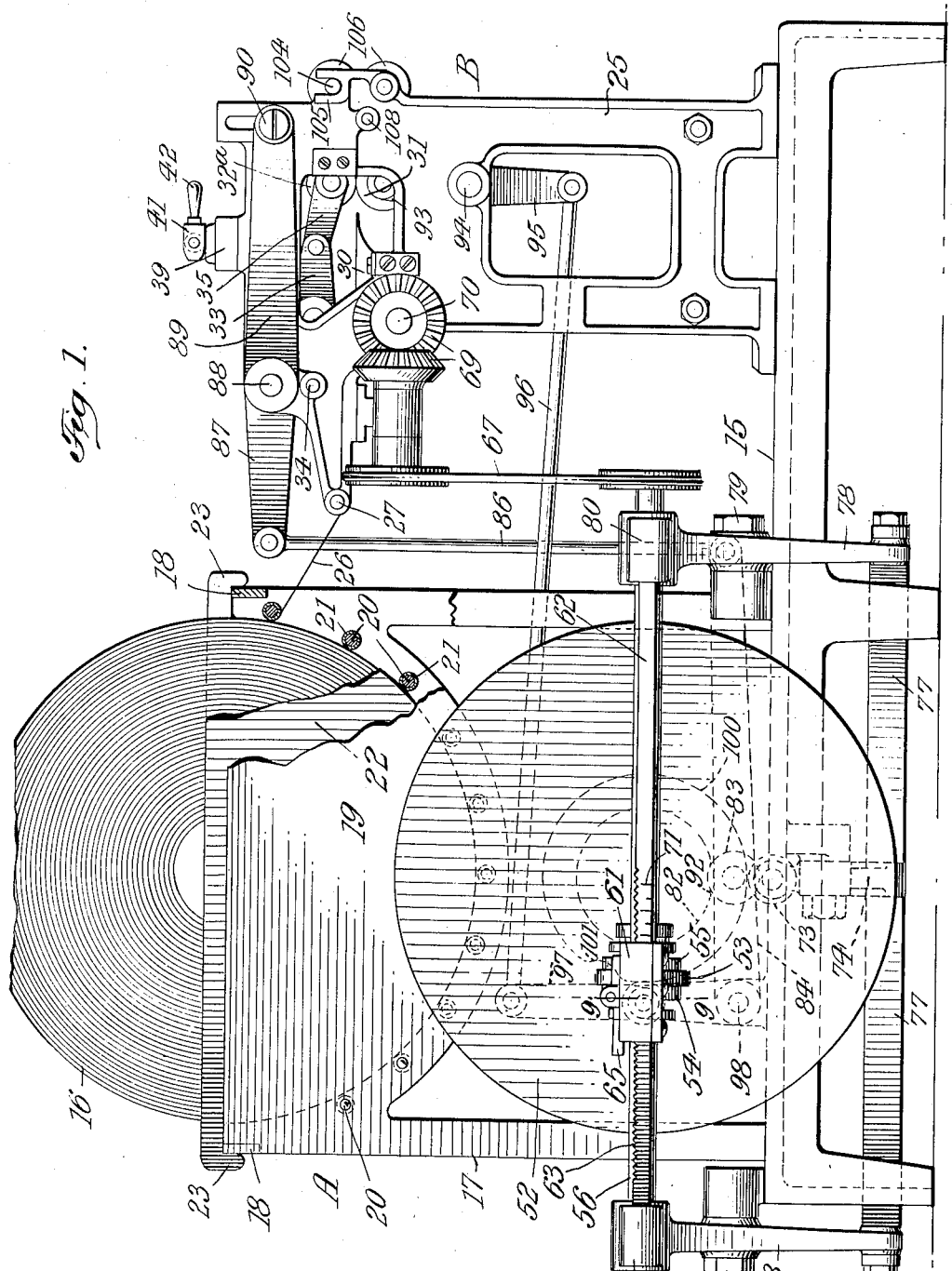
Figure 2:
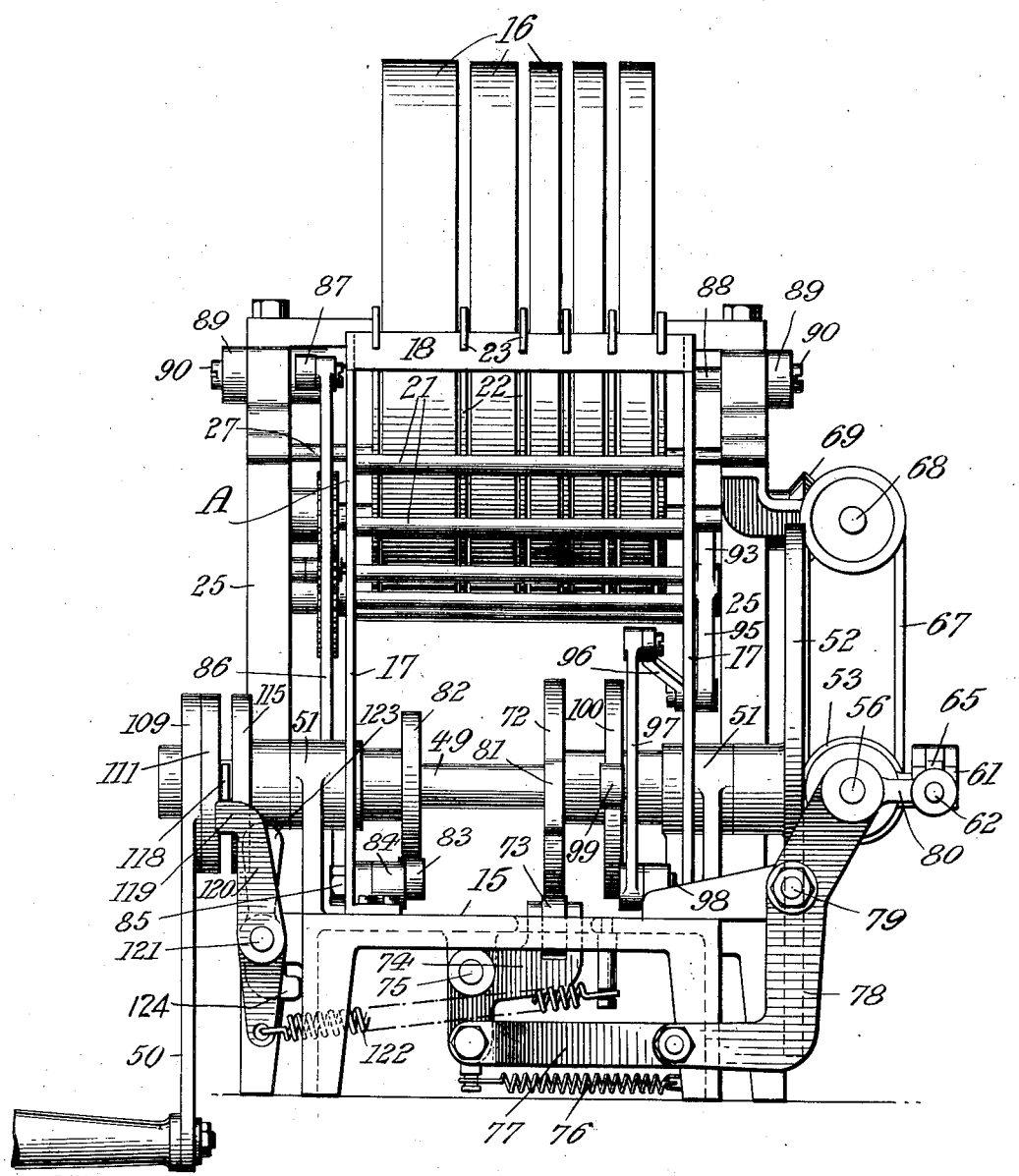
Figure 3:
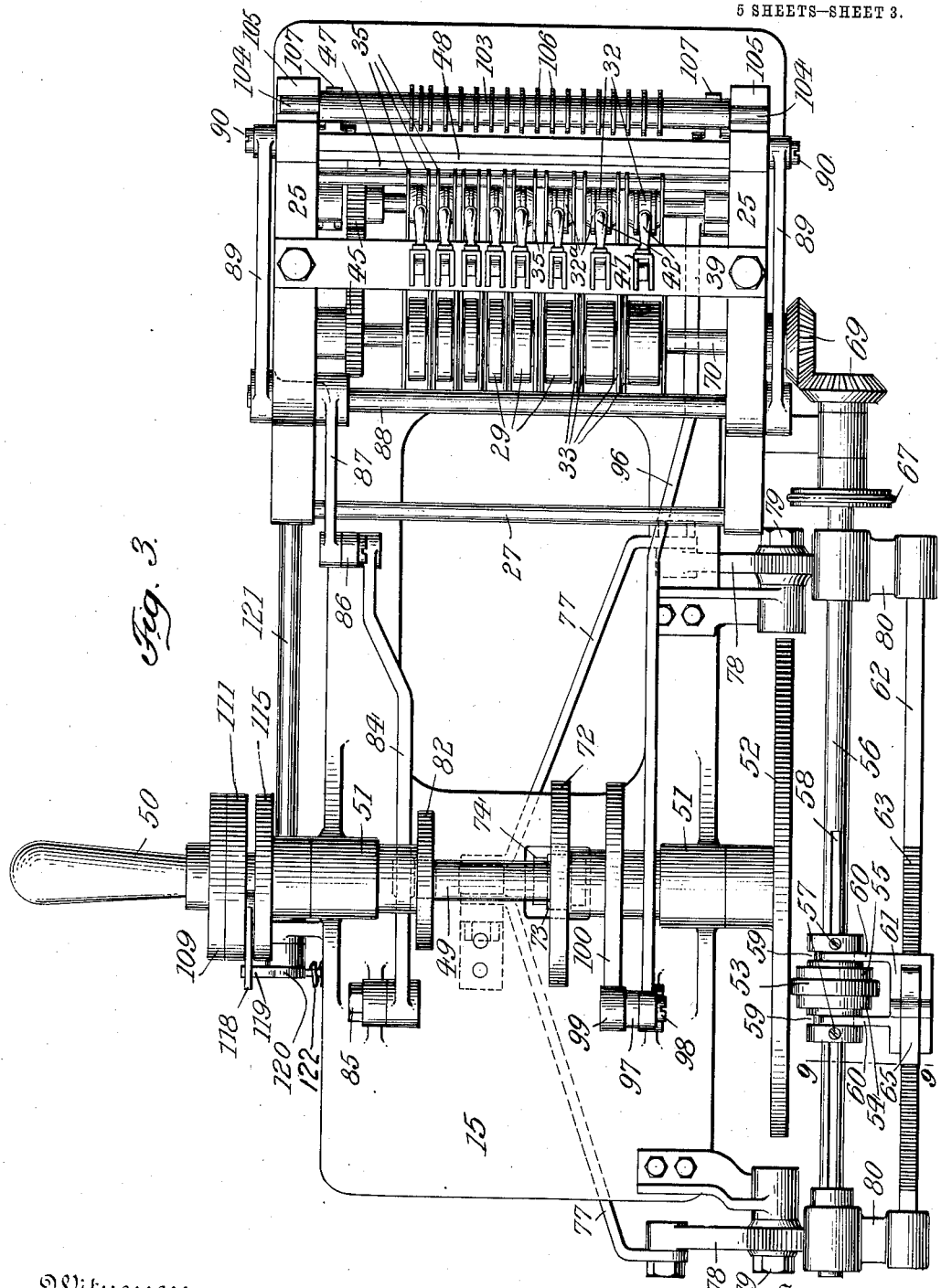

In the accompanying drawing: Figure 1 is a side elevation partly broken away of a machine embodying my invention; Fig. 2 an end view thereof; Fig. 3 a plan with the reel-holding basket omitted; Fig. 4 a vertical section through tape feeding and moistening means with the frame omitted; Fig. 5 a detail section of the pressure rollers and toggles; Fig. 6 a detail section of the tape cutting device; Fig. 7 a plan partly in section of the shaft coupling; Fig. 8 a cross section on line 8—8, Fig. 7; Fig. 9 a cross section on line 9—9, Fig. 1; Fig. 10 a section on line 10—10, Fig. 9; Fig. 11 a section on line 11—11, Fig. 9; and Fig. 12 a detail of the moistening roller and coöperating parts.

Upon a suitable bed plate 15 is mounted a holder A adapted to contain a plurality of tape reels 16 and a tape moistening and cutting device B. Holder A consists essentially of a pair of standards 17 projecting upwardly from bed plate 15 and connected at their top by a pair of transverse bars 18. Each standard 17 is provided with a substantially semicircular head 19, the heads being connected by a plurality of tie-rods 20 arranged in an arc concentric with heads 19, so as to form a trough-shaped basket adapted for the reception of reels 16. Rods 20 are preferably surrounded by freely rotatable sleeves 21, so as to permit a free rotation of the reels. In order to prevent the several reels 16 from interfering with one another and for maintaining them in a vertical position, spacing frames or plates 22 of preferably semicircular form are provided, said frames being furnished with hooks 23 adapted to engage bars 18.

It will be seen that by the construction described any one reel 16 may be readily exchanged or replaced by another reel without necessitating any manipulation of the remaining reels.

In proximity to reel holder A, there are mounted on bed plate 15 the standards 25 constituting the frame of the tape moistening and cutting device B. The tapes 26 unwound from reels 16 pass underneath a guide rod 27 and over a common feed drum 28 which receives rotary movement in manner hereinafter described. The tapes 26 are adapted to be held against the feed drum by means of a plurality of pressure rollers 29 which are independently movable in a vertical direction. The pressure rollers are shown to be of different widths, so as to coöperate with tapes of correspondingly varying widths, although it is obvious that for wide tapes two or more flanking pressure rollers may be used in order to effect a proper contact between said tape and the feed drum. From feed drum 28 the tapes which are coated on their lower side with an adhesive, travel over a guide 30 to a common moistening roller 31 to which the tapes advanced by the drum are held by pressure rollers 32 each provided with a pair of comparatively narrow annular ribs $32^a$. Pressure rollers 32 are also vertically movable, the construction being such that each pair of alined rollers 29, 32 is raised and lowered by a single manipulation. For this purpose, each roller 29 is hung in a pair of levers 33 flanking said rollers and turning on a transverse shaft 34. In like manner, each roller 32 is hung in a pair of preferably bent levers 35 freely rotatable on a shaft 36. At their free ends the levers 33, 35 are pivotally connected by a traverse 37 provided with an upwardly extending pin 38. The latter passes loosely through a corresponding aperture of a transverse bar 39 secured to standards 25. A spring 40 encircling pin 38 tends to lower the toggles jointly formed by levers 33, 35, while to the upper end of pin 38 is pivoted an eccentric keeper 41 having handle 42. It is obvious that when handle 42 is swung down as illustrated in Fig. 4, spring 40 by lowering toggles 33, 35 forces the pressure rollers 29, 32 into engagement with drum 28 and roller 31 respectively, while when handle 42 is swung up, the toggles will be raised against the action of spring 40 to correspondingly lift rollers 29, 32. When the machine is out of use, all handles 42 are preferably swung up. If one or more tapes of selected width are to be moistened and cut off from their respective reels, the corresponding handles 42 are swung down, so as to cause the desired simultaneous engagement between drum 28 and roller 29 and between rollers 31, 33 as will be readily understood. Roller 31 receives the moisture from a transfer roller 43 that dips into a fountain 44 supported by standards 25 in suitable manner. It is obvious that for a proper feed of the tapes and for a uniform application of the moisture, the drum 28 and moistening roller 31 should be positively rotated with a like surface speed for which purpose the drum and roller are mutually connected by a correspondingly dimensioned train of gear wheels 45 as clearly illustrated in Fig. 4. After leaving the moistening roller 31, the moistened tape is conveyed over guide 46 to the cutting device comprising a stationary blade 47 and a vertically movable blade 48 that receives intermittent reciprocating movement in manner hereinafter described.

Means are provided for setting the machine to automatically cut off any desired lengths of tapes without requiring the attendant to perform any measuring operation. For this purpose all of the parts described are mutually connected with each other, so as to perform the various operations in the necessary order and at the proper time, the construction being such that after setting the machine to the desired tape length, the driving shaft hereinafter described receives but a single complete rotation, during which all of the necessary movements take place for the delivery of the moistened severed tape, while upon the completion of such rotation, the machine comes automatically to a standstill. The means for producing this result are as follows: The driving shaft 49 hereinabove referred to is shown to be manually rotated by a crank 50, although obviously any other driving means may be employed. Shaft 49 is journaled in suitable bearings 51 projecting upwardly from bed plate 15 and carries a friction disk 52. The latter is adapted to be engaged by a friction roller 53 made preferably of vulcanized fiber or hard rubber and clamped by nut 54 to a sleeve 55 which is slidably mounted on a shaft or spindle 56 supported in manner hereinafter described. Sleeve 55 is prevented from rotating upon shaft 56 by means of a pair of screws 57 tapped into said sleeve and projecting into a longitudinal groove 58 of said shaft. Sleeve 55 is furnished with a pair of circumferential recesses 59 which are engaged by a pair of forks 60 forming part of a slide 61. The latter is movably fitted on a squared rod 62 extending in parallelism with shaft 56. In order to prevent an accidental displacement of slide 61 on rod 62, the latter is serrated as at 63 for the engagement with the correspondingly serrated heel 64 of a spring-influenced keeper 65 pivoted at 66 to slide 61. Shaft 56 is by a suitable drive 67 connected with an arbor 68 which is in turn by miter wheels 69 intergeared with the axle 70 of feed drum 28. It will be seen that by rotating handle 50, motion will be transmitted through the parts 52, 53, shaft 56, drive 67, arbor 68, miter wheels 69 to feed drum 28 and consequently by the train of gears 45 to the moistening roller 31, the extent to which said drum and roller are rotated depending upon the distance of roller 53 from the center of disk 52. By providing a suitable scale 71 for instance on rod 62, and by properly setting roller 53 on shaft 56, any tape length desired may be unreeled without necessitating a measuring operation, thereby saving time and preventing waste. In order to permit a free adjustment of roller 53 after the free end of keeper 65 has been depressed and without entailing any undue friction between said roller and disk 52, means are provided which retract shaft 56 and roller 53 from the disk as soon as shaft 49 has completed one rotation. For this purpose, shaft 49 carries a cam 72 which is engaged by the roller 73 of a cam lever 74 pivoted at 75 to bed plate 15 and influenced by a spring 76. Lever 74 is by diverging links 77 connected to a pair of elbow levers 78 pivoted at 79 to bed plate 15. In the upper arms of these levers is journaled shaft 56 while a pair of laterally extending arms 80 supports rod 62. The arrangement of the parts is such, that when shaft 49 is about to complete a full revolution, a bulge 81 of cam 72 will engage roller 73 so as to cause a corresponding tilting of levers 74, 78 thereby swinging roller 53 away from disk 52. In this way the roller 53 may be readily set while the machine is at a standstill, whereas immediately upon the start of the machine, bulge 81 will clear roller 73 to permit spring 76 to draw roller 53 against disk 52 thereby actuating the above described tape feeding and moistening means. After the desired length of tape has been unreeled, the feed is interrupted owing to the above described engagement of roller 73 with the bulge 81 of cam 72, whereupon the tape-length projecting beyond cutter 47, 48 is severed in the following manner: Shaft 49 carries a cam 82 which is engaged by the roller 83 of a spring influenced lever 84 pivoted at 85 to plate 15. The free end of lever 84 is by link 86 connected to an arm 87 fast on a rock shaft 88 which projects outwardly through standards 25. To the free ends of shaft 88 is secured a pair of arms 89 connected by screws 90 to the cutter blade 48 that is vertically slidable in corresponding grooves 91 of standards 25. The relative arrangement of the parts is such that immediately after cam roller 73 has engaged bulge 81 to arrest the tape feed, cam roller 83 enters a notch 92 of cam 82, thereby permitting the spring influenced lever 84 to rock shaft 88 and thereby lower blade 48 for severing the tape-length extending beyond said blade.

It will be seen from Fig. 4 that after the cutting operation has taken place, the unsevered tape extends over moistening roller 31 to the cutter 47, 48. In order to prevent an undue sticking of the moistened tape to roller 31 after the machine has come to a standstill, said roller is swung away from the tape and beneath guide 30 in the following manner: Roller 31 is hung in a pair of levers 93 fast on a shaft 94 upon which the moisture transfer roller 43 is loosely mounted. One of the levers 93 is extended downward as at 95 for the engagement with a link 96 which is connected to a spring-influenced cam lever 97 pivoted at 98 to bed plate 15 and carrying a roller 99. The latter engages a cam 100 mounted on shaft 49 and provided with a notch 101. At or about the time when roller 85 of the cutting device enters its cam-notch 92, roller 99 of lever 97 enters notch 101 so as to tilt levers 93 in the direction of the arrow (Fig. 4) thereby swinging the moistening roller under guide 30 and preventing an unduly prolonged contact between the tape and roller when the machine comes to a standstill. The tilting movement of levers 93 is utilized for actuating a gripping device that prevents the severed tape or tapes from slipping out of the machine after the cutting operation has taken place. This device is shown to consist of a lower tape-supporting roller 102 having a stationary pivot and of a vertically movable gravity roller 103, the gudgeons 104 of which are received within a pair of slotted bearings 105 of standards 25. Both rollers 102, 103 are provided with annular ribs 106 that prevent any objectionable sticking of the moistened tapes. Levers 93 are engaged by the lower arms of two-arm levers 107 pivoted at 108, while the upper arms of said levers engage gravity roller 103. The relative arrangement of the parts is such that when roller 31 is in its raised or operative position, roller 103 is raised off roller 102 so as to permit an unobstructed passage of the moistened tape. As soon as roller 31 however recedes under guide 30, levers 107 are liberated to permit roller 103 to descend by gravity, and thereby prevent a dropping of the severed tape section owing to its frictional engagement with rollers 102, 103, whereupon the tape may be readily pulled out by hand.

For automatically arresting the machine after shaft 49 has made a complete revolution independent of an excessive turn that may be given to crank 50, the following construction has been devised: Crank 50 forms part of a disk 109 that loosely turns on shaft 49. To disk 109 is secured by screws 110 a ring 111 having internal teeth 112 that are adapted to be engaged by a pawl 113. The latter is free to rotate on a stud 114 of a disk 115 facing ring 111 and firmly secured to shaft 49. Pawl 113 is provided with a heel 116 which is engaged by a spring 117, said spring tending to tilt the pawl into engagement with teeth 112. To pawl 113 is secured an abutment 118 which is adapted to be engaged by the hook shaped end 119 of an arm 120 fast on a rock shaft 121, a spring 122 drawing hook 119 into engagement with abutment 118. To shaft 121 is secured a handle 123, a lower heel 124 of which limits the outward play of hook 119. When starting the machine, handle 123 is first swung inward to withdraw hook 119 from abutment 118 and thereby permit spring 117 to tilt pawl 113 and thus throw it into engagement with teeth 112. Upon the subsequent release of handle 123 hook 119 will thus bear against the inner face of abutment 118, so that crank 50 may now be freely rotated to perform the operations described. As soon as abutment 118 during its rotation clears hook 119, the latter will be swung outward and into the path of said abutment. When the rotation of shaft 49 is completed, abutment 118 will again engage hook 119 thereby withdrawing pawl 113 from teeth 112 and arresting the shaft.

The operation is as follows: After a tape of proper width has been selected, the corresponding handle 42 is swung down to lower its rollers 29, 32 upon the tape resting on drum 28 and guide 30. Slide 61 is then set to the desired length of the tape, whereupon handle 123 is swung inward to release abutment 118 and swing pawl 113 into engagement with teeth 112. Crank 50 is now turned during which movement the cutting blade 48 is raised, the moistening roller 31 is swung up into engagement with the tape and the gravity roller 103 is raised to permit an unobstructed advance of the tape. Immediately after these operations have been performed, levers 74, 78 are tilted, so as to swing friction roller 53 into engagement with disk 52, thereby rotating drum 29 and moistening roller 31. After the desired length of tape has thus been unreeled and moistened blade 48 descends to cut the tape, while at the same time the moistening roller 31 is withdrawn from the unsevered tape portion, and the gravity roller 103 is lowered to prevent the severed tape portion from slipping out of the machine. The gravity roller is of particular importance if a number of tapes are simultaneously cut off as it holds them in place until successively withdrawn by the attendant. After shaft 49 has completed its revolution, abutment 118 engages hook 119 so as to uncouple pawl 113 from toothed ring 11 and thereby arrest the machine which is thus ready for the next operation.

I claim:

1. A machine of the character described, comprising a tape reel, a driving shaft, means operated by said shaft for withdrawing a length of tape from said reel, means likewise operated by said shaft for moistening and cutting the tape, means likewise operated by said shaft for effecting a disengagement between the tape and the moistening means after the withdrawn tape-length has been moistened, and means for automatically arresting the shaft after the completion of the cutting operation.

2. A machine of the character described, comprising a feed drum adapted to be engaged by a tape, a first pressure roller arranged above said drum, a moistening roller also adapted to be engaged by the tape, a second pressure roller arranged above said moistening roller, and toggle-levers supporting both of said pressure rollers.

3. A machine of the character described, comprising a feed drum adapted to be engaged by a tape, a first pressure roller arranged above said drum, a moistening roller also adapted to be engaged by the tape, a second pressure roller arranged above said moistening roller, toggles supporting both of said rollers, a spring engaging said toggles and tending to lower the pressure rollers into engagement with the feed drum and moistening roller respectively, and means for locking the toggles in their raised position.

4. A machine of the character described, comprising a feed drum adapted to be engaged by a tape, a moistening roller adapted to be subsequently engaged by said tape, a guide intermediate said drum and roller and located below the tape, and means for moving the moistening roller under said guide and away from the tape.

5. A machine of the character described, comprising a feed drum adapted to be engaged by a tape, a moistening roller adapted to be subsequently engaged by said tape, a guide intermediate said drum and roller and located below said tape, means for moving the moistening roller under said guide and away from the tape, and means for cutting the tape.

6. A machine of the character described, comprising a feed drum adapted to be en-gaged by a tape, a moistening roller, means for swinging said roller into or out of engagement with the tape, a lower tape-supporting roller, a vertically movable upper gravity roller, and means controlled by the roller-swinging means for raising said gravity roller.

7. A machine of the character described, comprising a feed drum adapted to be engaged by a tape, a moistening roller, a pair of levers supporting said roller, so as to swing the same into or out of engagement with the tape, a tape supporting roller, a gravity roller adapted to hold the tape in engagement with the supporting roller, and means coöperating with the levers for raising the gravity roller.

8. A machine of the character described, comprising a feed drum adapted to be engaged by a tape, a moistening roller, a pair of levers supporting said roller so as to swing the same into or out of engagement with the tape, a tape supporting roller, a gravity roller adapted to hold the tape in engagement with the supporting roller, and a pair of two-arm levers engaging the first named levers and the gravity roller.

9. A machine of the character described, comprising a driving shaft, a friction disk carried thereby, an axially movable friction roller, means controlled by the shaft for bringing said roller into and out of engagement with the disk, a tape-feed drum operatively connected to the friction roller, and a tape-moistening device and a tape-cutting device both operatively connected to the driving shaft.

10. A machine of the character described, comprising a driving shaft, a friction disk and a cam carried thereby, an axially movable friction roller, means actuated by the cam for swinging said roller into or out of engagement with the disk, a tape-feed drum operatively connected to the friction roller, a tape-moistening device and a tape-cutting device operatively connected to said driving shaft, and means for automatically arresting the driving shaft after the completion of a full rotation.

11. A machine of the character described, comprising a driving shaft, a friction disk and a cam carried thereby, a cam lever actuated by said cam, a pair of two-arm levers linked to said cam lever, a spindle hung in said two-arm levers, a friction roller slidable and non-rotatable on said spindle and adapted to engage the friction disk, means for maintaining the friction roller in position after being set on the spindle, a tape feed drum operatively connected to said friction roller, and tape moistening and tape cutting means both operatively connected to the driving shaft.

12. A machine of the character described, comprising a driving shaft, a friction disk fast thereon, a spindle, a sleeve slidably and non-rotatably mounted on said spindle and carrying a friction roller, a serrated rod extending in parallelism with the spindle, a slide movable on the rod and engaging the sleeve, a keeper pivoted to the slide and adapted to engage the rod, means for oscillatively supporting the spindle and rod so as to swing the friction roller into and out of engagement with the friction disk, and a tape feed drum operatively connected to said friction roller.

13. A machine of the character described, comprising a basket adapted to receive a plurality of tape-reels, plates hung into said basket for spacing said reels, a feed drum adapted to be engaged by the tapes, and tape-moistening and tape-cutting means adapted to be consecutively engaged by the tapes.

14. A machine of the character described, comprising a basket composed of a pair of heads and a plurality of connecting rods arranged in an arc and adapted to support a plurality of tape-reels, spacing means suspended within the basket between the reels, a feed drum adapted to be engaged by the tapes, and tape-moistening and tape-cutting means adapted to be consecutively engaged by the tapes.

JOSEPH FROHN.

Witnesses:
FRANK V. BRIESEN,
KATHERYNE KOCH.